United States Patent
Kobayashi

(10) Patent No.: US 7,946,955 B2
(45) Date of Patent: May 24, 2011

(54) VEHICLE CONTROL APPARATUS AND METHOD

(75) Inventor: Masaaki Kobayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 845 days.

(21) Appl. No.: 11/987,377

(22) Filed: Nov. 29, 2007

(65) Prior Publication Data

US 2008/0161156 A1 Jul. 3, 2008

(30) Foreign Application Priority Data

Dec. 27, 2006 (JP) ................................ 2006-352581

(51) Int. Cl.
*F16H 59/50* (2006.01)
(52) U.S. Cl. .......................................... 477/97
(58) Field of Classification Search .................. None
See application file for complete search history.

(56) References Cited

U.S. PATENT DOCUMENTS

| | | | | |
|---|---|---|---|---|
| 6,935,989 | B2 * | 8/2005 | Shibagaki | 477/98 |
| 7,035,724 | B2 * | 4/2006 | Tokuda et al. | 701/54 |
| 2004/0043866 | A1 | 3/2004 | Hrovat et al. | |
| 2004/0128987 | A1 * | 7/2004 | Kuboshima et al. | 60/295 |
| 2006/0266017 | A1 | 11/2006 | Kresse | |

FOREIGN PATENT DOCUMENTS

| | | |
|---|---|---|
| EP | 1 437 492 A1 | 7/2004 |
| FR | 2 879 242 | 6/2006 |
| JP | A-2004-044722 | 2/2004 |
| JP | A-2004-211638 | 7/2004 |
| JP | A-2005-076520 | 3/2005 |
| JP | A-2005-344678 | 12/2005 |

OTHER PUBLICATIONS

European Search Report in European Patent Application No. 07 12 2583 on May 7, 2010.

* cited by examiner

*Primary Examiner* — Sherry Estremsky
(74) *Attorney, Agent, or Firm* — Oliff & Berridge, PLC

(57) ABSTRACT

A vehicle control apparatus includes a controller. When predetermined conditions are satisfied, the controller executes a neutral control that forcibly places an automatic transmission in a substantially neutral state, the predetermined conditions including the shift position of the automatic transmission being in the drive position. When it is determined that the amount of exhaust matter accumulated in a catalyst provided in an exhaust system of a vehicle has exceeded a first reference value, the controller executes a catalyst heating control that increases the temperature of the catalyst so as to remove the exhaust matter accumulated in the catalyst. When it is determined during the catalyst heating control that the amount of the exhaust matter accumulated in the catalyst has exceeded a second reference value that is larger than the first reference value, the controller prohibits the execution of the neutral control.

14 Claims, 2 Drawing Sheets

VEHICLE CONTROL APPARATUS AND METHOD

INCORPORATION BY REFERENCE

The disclosure of Japanese Patent Application No. 2006-352581 filed on Dec. 27, 2006 including the specification, drawings and abstract is incorporated herein by reference in its entirety.

BACKGROUND OF THE INVENTION

1. Field of the Invention

The invention relates to a vehicle control apparatus and method that executes a neutral control that forcibly places an automatic transmission of a vehicle in a substantially neutral state when the shift position of the automatic transmission is in the drive position and a catalyst heating control that increases the temperature of a catalyst provided in the exhaust system.

2. Description of the Related Art

An exhaust gas purification device for internal combustion engines, such as vehicle diesel engines, reduces the particulate matter (PM: Particulate Matter) discharged outside of the internal combustion engine by trapping the particulate matter contained in the exhaust gas discharged from the internal combustion engine using an exhaust gas purification catalyst provided in an exhaust passage. Normally, the function of such an exhaust gas purification catalyst deteriorates as the amount of the particulate matter accumulated in the exhaust gas purification catalyst increases. Therefore, in response to the amount of the accumulated particulate matter exceeding a reference amount, a catalyst heating control is executed to increase the temperature of the exhaust gas purification catalyst so that the accumulated particulate matter is combusted and thus removed.

Meanwhile, in vehicles having an automatic transmission, even when the shift position of the automatic transmission is in the drive position, a so-called neutral control, which is a control for forcibly placing the automatic transmission in a substantially neutral state, is executed in order to improve the fuel economy if predetermined conditions, such as the accelerator operation amount being equal to or smaller than a predetermined amount, are satisfied. However, because the load of the internal combustion engine decreases during the neutral control, if the duration of the neutral control is excessively long, it leads to a decrease in the exhaust gas temperature. As such, in vehicles in which the neutral control and the aforementioned catalyst heating control are both executed, if the neutral control is executed during the catalyst heating control, it may cause a decrease in the exhaust gas temperature and thus may make it difficult for the accumulated particulate matter to be combusted and thus removed, resulting in a delay in recovering the function of the exhaust gas purification catalyst.

In view of this, in the vehicle recited in Japanese Patent Application Publication No. JP-2004-44722 (JP-A-2004-44722), the execution of the neutral control is restricted during the catalyst heating control. As such, the foregoing decrease in the exhaust gas temperature is suppressed, whereby the temperature of the exhaust purification catalyst is reliably increased. Therefore, the accumulated particulate matter is efficiently combusted and thus removed, so that the function of the exhaust gas purification catalyst is recovered reliably.

However, in the vehicle recited in Japanese Patent Application Publication No. JP-2004-44722, the reduction of the fuel economy resulting from the restriction on the neutral control is not ignorable although it is true that such restriction on the neutral control helps recover the function of the exhaust gas purification catalyst reliably as mentioned above. Further, executing the neutral control unavoidably causes a delay in recovering the function of the exhaust gas purification catalyst although contributing to improving the fuel economy.

Such problems occur not only to vehicle control apparatuses adapted to execute a control for increasing the temperature of a catalyst to combust and thus remove particulate matter in the catalyst, but also to vehicle control apparatuses that execute a catalyst heating control for various other purposes, such as those adapted to execute a control for increasing the temperature of a catalyst to remove sulfur in the catalyst.

SUMMARY OF THE INVENTION

The invention provides a vehicle control apparatus and a vehicle control method that achieve both the improvement of the fuel economy and the recovery of the catalyst function effectively.

Aspects of the invention relates to a vehicle control apparatus and a vehicle control method including a controller, wherein: when predetermined conditions are satisfied, the controller executes a neutral control that forcibly places an automatic transmission in a substantially neutral state, the predetermined conditions including a shift position of the automatic transmission being in a drive position; and when it is determined that the amount of exhaust matter accumulated in a catalyst provided in an exhaust system of a vehicle has exceeded a first reference value, the controller executes a catalyst heating control that increases the temperature of the catalyst so as to remove the exhaust matter accumulated in the catalyst. According to the vehicle control apparatus and a vehicle control method described above, when it is determined during the catalyst heating control that the amount of the exhaust matter accumulated in the catalyst has exceeded a second reference value that is larger than the first reference value, the controller prohibits the execution of the neutral control.

According to the vehicle control apparatus and a vehicle control method described above, when the amount of exhaust matter accumulated in the catalyst has exceeded the second reference value, that is when the function of the catalyst has largely deteriorated and the necessity of executing the catalyst heating control is high, the execution of the neutral control is prohibited. This feature helps recover the function of the catalyst although the fuel economy improving effect by the neutral control lessens. On the other hand, when the amount of exhaust matter accumulated in the catalyst is equal to or smaller than the second reference value, that is when the necessity of executing the catalyst heating control is low, the neutral control is executed and therefore the fuel economy improves accordingly. According to the vehicle control apparatus and a vehicle control method descried above, as such the execution of the neutral control is prohibited in accordance with the degree of deterioration of the function of the catalyst during the catalyst heating control, so that the improvement of the fuel economy and the recovery of the catalyst function are both achieved effectively.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
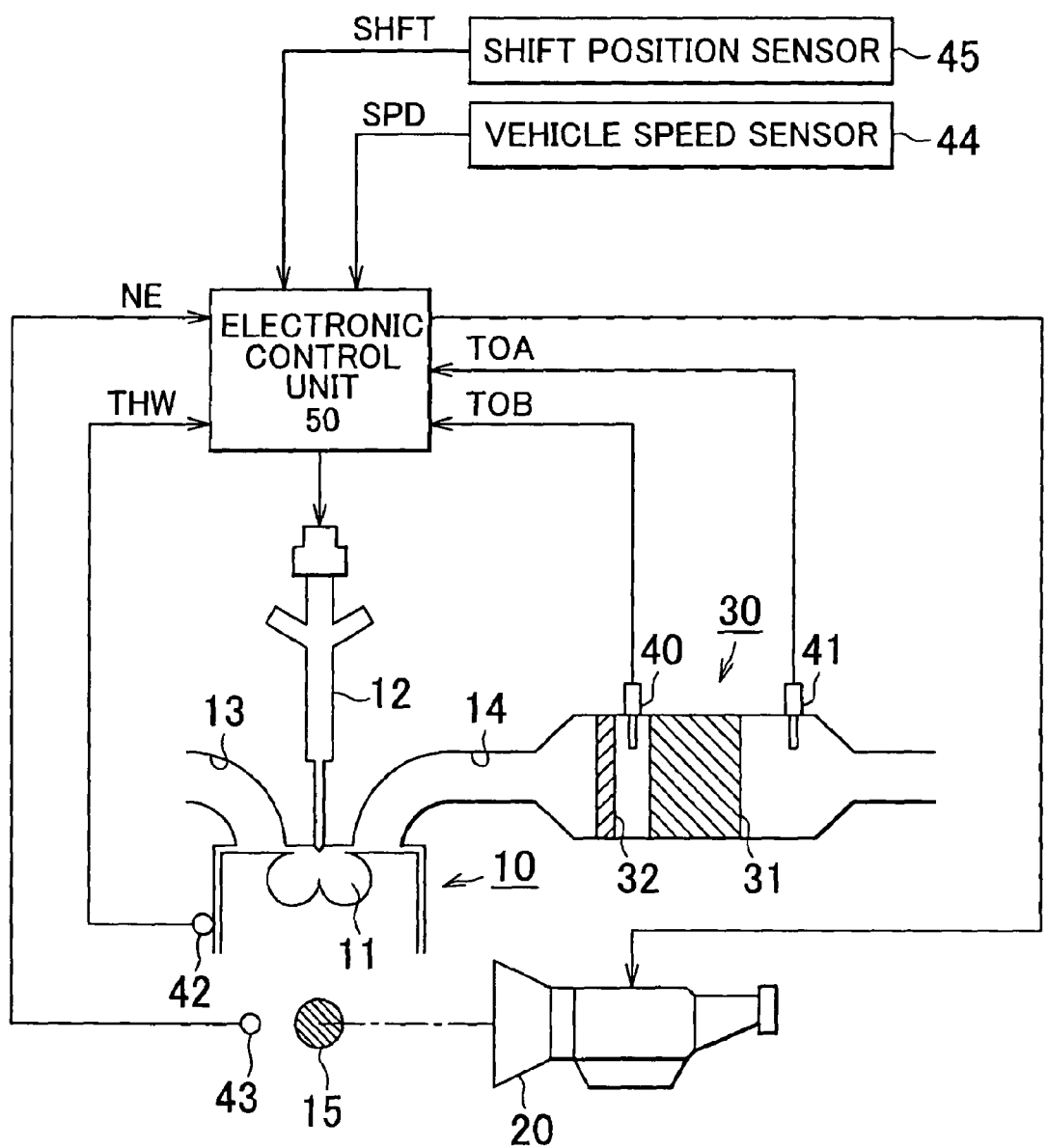
FIG. 1 is a view schematically showing the configuration of a vehicle incorporating a vehicle control apparatus according to an example embodiment of the invention.

Hereinafter, a vehicle control apparatus according to an example embodiment of the invention will be described with reference to FIG. 1 and FIG. 2.

First, the overall configuration of the vehicle control apparatus of this example embodiment will be described with reference to FIG. 1. Referring to FIG. 1, in an engine 10 of the vehicle, air-fuel mixtures formed of the fuel injected from fuel injection valves 12 and the intake air supplied from an intake passage 13 are combusted in combustion chambers 11, and the exhaust gas produced from the combustion is discharged to an exhaust passage 14. The engine 10 has a crankshaft 15 that is the output shaft of the engine 10. The crankshaft 15 is rotated by the energy produced from the combustion in each combustion chamber 11. The engine 10 is connected to an automatic transmission 20 via the crankshaft 15. The automatic transmission 20 changes the output torque of the engine 10. More specifically, the automatic transmission 20 changes the torque transmitted from the crankshaft 15 to the output shaft of the automatic transmission 20 by applying and releasing various gears and clutches incorporated in the automatic transmission 20.

A catalyst unit 30 is provided in the exhaust passage 14. The catalyst unit 30 is constituted of a PM filter 31 that traps particulate matter (PM) in the exhaust gas flowing in the exhaust passage 14 and an oxygen catalyst 32 that is provided upstream of the PM filter 31 and removes hydrocarbon (HC) and carbon monoxide (CO), which are unburned components in the exhaust gas, by oxidizing them. The catalyst unit 30 reduces the amount of particulate matter discharged outside from the exhaust passage 14 by trapping the particulate matter using the PM filter 31. In this catalyst unit 30, the temperature of the exhaust gas is increased by the heat generated through the above-described oxidization at the oxygen catalyst 32, whereby the particulate matter trapped in the PM filter 31 is combusted and thus removed using the heat generated.

In the vehicle, various sensors for detecting the state of the vehicle are provided. For example, an exhaust gas temperature sensor 40 that detects an upstream side exhaust gas temperature TOB representing the temperature of exhaust gas upstream of the PM filter 31 and an exhaust gas temperature sensor 41 that detects a downstream side exhaust gas temperature TOA representing the temperature of the exhaust gas downstream of the PM filter 31 are provided in the exhaust passage 14 of the engine 10. Further, a coolant temperature sensor 42 that detects a coolant temperature THW representing the temperature of the coolant circulated in the engine 10 and a rotation speed sensor 43 that detects an engine speed NE representing the rotation speed of the crankshaft 15 are provided in the engine 10. Further, in the vehicle in which the engine 10 is mounted, a vehicle speed sensor 44 that detects a vehicle speed SPD and a shift position sensor 45 that detects the position of the shift lever of the automatic transmission 20 and outputs a shift position signal SHIFT indicating the detected position of the shift lever are provided. The shift position of the shift lever is selected by the driver from among, basically, "P (Parking range)", "N (Neutral range)", "D (Drive range)", and "R (Reverse range)".

The signals output from these sensors 40 to 45, etc. are input to an electronic control unit 50. The electronic control unit 50 is a component that is provided with a processing unit, memories, etc. and governs the control of the engine 10, the automatic transmission 20, and other components and devices. The electronic control unit 50 determines various conditions related to the operation of the vehicle mainly based on the outputs of the foregoing sensors 40 to 45 and executes various controls for the vehicle based on the determined vehicle operation conditions. Note that the electronic control unit 50 may be regarded as one example of "controller" of the invention.

For example, the electronic control unit 50 sets a fuel injection amount Q based on the detected vehicle operation conditions and executes a fuel injection control in which the fuel injection pattern of each fuel injection valve 12 is changed based on the fuel injection amount Q. Further, the electronic control unit 50 executes a catalyst heating control when it is determined that the amount of the particulate matter accumulated in the catalyst unit 30 (i.e., the PM filter 31) has exceeded a reference value PMt1 that is a threshold for determining the degree of deterioration of the function of the catalyst unit 30. In the catalyst heating control, the injection pattern of each fuel injection valve 12 is changed so as to increase the temperature of the catalyst unit 30 so that the accumulated particulate matter is combusted and thus removed. Further, when given conditions are satisfied while the shift position of the automatic transmission 20 is in the "D" position (i.e., the drive position), the electronic control unit 50 executes a neutral control in which some of the clutches in the automatic transmission 20 are released to forcibly place the automatic transmission 20 in a substantially neutral state. This neutral control is executed in order to suppress the waste of the output of the engine 10 at the automatic transmission 20 (in particular at the torque converter of the automatic transmission 20).

With regard to the catalyst heating control and the neutral control described above, the vehicle control apparatus of the invention is adapted to prohibit the execution of the neutral control in accordance with the degree of deterioration of the function of the catalyst unit 30 during the catalyst heating control, so that the improvement of the fuel economy and the recovery of the catalyst function for trapping particulate matter are both achieved effectively.

Figure 2:
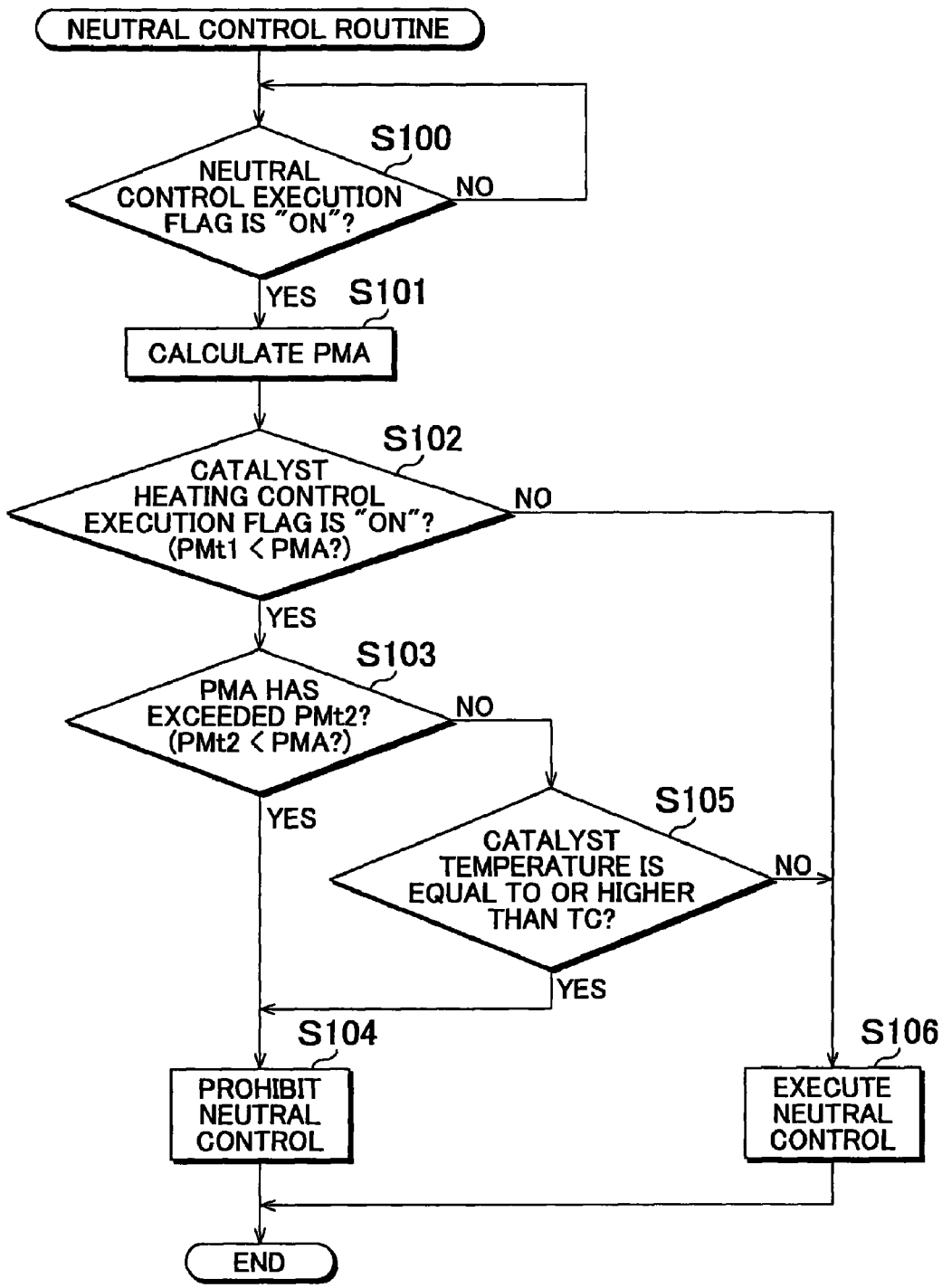
FIG. 2 is a flowchart illustrating the procedure of the neutral control executed by the vehicle control apparatus of the example embodiment.

FIG. 2 illustrates the procedure of the neutral control of this example embodiment. Hereinafter, this procedure will be described in detail with reference to FIG. 2. Referring to FIG. 2, in the neutral control, it is first determined whether a neutral control execution flag is presently "ON" (step 100). The neutral control execution flag is set to "ON" when, for example, the following AND conditions are all satisfied: (A1) the shift position of the automatic transmission 20 is in the drive position; (A2) the engine 10 has already been warmed up; (A3) the engine speed NE is stable; and (A4) the vehicle is at a standstill.

Whether these conditions (A1) to (A4) are satisfied is determined as follows. The condition (A1) is satisfied if the shift position signal SHIFT is indicating that the shift position of the automatic transmission 20 is in the "D" position. The condition (A2) is satisfied if the coolant temperature THW is higher than a reference value. The condition (A3) is satisfied if the deviation between the maximum value and the minimum value of the engine speed NE in a given time period is equal to or smaller than a reference value for determining fluctuation of the engine speed NE. The condition (A4) is satisfied if the vehicle speed SPD is zero.

If all of these conditions (A1) to (A4) are satisfied, the neutral control execution flag is set to "ON". Note that other condition or conditions may be added to the conditions (A1) to (A4) or one or more of the conditions (A1) to (A4) may be omitted as needed.

When it is determined, in the manner described above, that the neutral control execution flag is presently "ON" (step 100: YES), an accumulated particulate matter amount PMA representing the amount of the particulate matter accumulated in the catalyst unit 30 (that is, in the PM filter 31) is calculated (step 101). More specifically, the accumulated particulate matter amount PMA is calculated based on the engine speed NE, the fuel injection amount Q, and so on. The relation among the engine speed NE, the fuel injection amount Q, and the accumulated particulate matter amount PMA is stored in the memory of the electronic control unit 50 in the form of a function map, and the electronic control unit 50 calculates the accumulated particulate matter amount PMA by referring to this function map.

After the accumulated particulate matter amount PMA has been calculated in the manner described above, it is then determined whether a catalyst heating control execution flag is presently "ON" (step 102). The catalyst heating control execution flag is set to "ON" if the accumulated particulate matter amount PMA calculated as described above is larger than a reference value PMt1. If the catalyst heating control execution flag is presently "ON", the catalyst heating control is being executed.

Thus, when it is determined, in the manner described above, that the catalyst heating control execution flag is "ON" (step 102: YES), that is when it is determined that the catalyst heating control is being executed, it is then determined whether the amount of particulate matter accumulated in the catalyst unit 30 has exceeded a reference value PMt2 that is larger than the reference value PMt1. That is, at this time, it is determined whether the accumulated particulate matter amount PMA calculated as described above is larger than the reference value PMt2. Note that the reference value PMt2 is a threshold for determining whether the function of the catalyst unit 30 has largely deteriorated and the necessity of executing the catalyst heating control is presently high.

If it is determined, in the manner described above, that the amount of particulate matter accumulated in the catalyst unit 30 has exceeded the reference value PMt2 (step 103: YES), that is if it is determined that the necessity of executing the catalyst heating control is high, the execution of the neutral control is then prohibited (step 104). This prohibition of the neutral control helps recover the function of the catalyst unit 30 although the fuel economy improving effect by the neutral control lessens.

On the other hand, if it is determined in step 103 that the amount of particulate matter accumulated in the catalyst unit 30 is equal to or smaller than the reference value PMt2 (step 103: NO), that is if the necessity of executing the catalyst heating control is low, it is then determined whether the temperature of the catalyst unit 30 is equal to or higher than an activation temperature TC of the catalyst unit 30 (step 105). More specifically, an estimated catalyst temperature TPC is calculated from the upstream side exhaust gas temperature TOB detected by the exhaust gas temperature sensor 40 and the downstream side exhaust gas temperature TOA detected by the exhaust gas temperature sensor 41. Then, if the estimated catalyst temperature TPC is equal to or higher than the activation temperature TC of the catalyst unit 30, it is determined that the temperature of the catalyst unit 30 is equal to or higher than the activation temperature TC.

The execution of the neutral control is prohibited (step 104) also when it is determined that the temperature of the catalyst unit 30 is equal to or higher than the activation temperature TC (step 105: YES). As such, even in the case where the accumulated particulate matter amount PMA is relatively small, that is the amount of the particulate matter accumulated in the catalyst unit 30 is relatively small and therefore the necessity of executing the catalyst heating control is low, if the temperature of the catalyst unit 30 is high, the execution of the neutral control is prohibited. This improves the efficiency of the catalyst heating control and thus helps recover the function of the catalyst unit 30 promptly. Further, because the activation temperature TC of the catalyst unit 30 is used as the reference value for the temperature of the catalyst unit 30, the function of the catalyst unit 30 can be reliably recovered by executing the catalyst heating control.

On the other hand, if it is determined that the catalyst heating control execution flag is presently "OFF" (step 102: NO), or if it is determined that the temperature of the catalyst unit 30 is lower than the activation temperature TC (step 105: NO), the neutral control is executed (step 106). More specifically, when the catalyst heating control is not being performed (step 102: NO), the neutral control is executed to improve the fuel economy (step 106). Further, when the necessity of executing the catalyst heating control is low while the catalyst heating control is being executed (step 103: NO) and it is considered that it would take long time to heat the catalyst unit 30 up to the activation temperature TC through the catalyst heating control (step 105: NO), the neutral control is executed to improve the fuel economy (step 106).

Accordingly, the vehicle control apparatus of this example embodiment provides the following effects.

(Effect 1) The execution of the neutral control is prohibited when the amount of particulate matter accumulated in the catalyst unit 30 (that is, in the PM filter 31) is larger than the reference value PMt2, that is when the function of the catalyst unit 30 has deteriorated significantly and thus the necessity of executing the catalyst heating control is high. This feature helps recover the function of the catalyst unit 30 although the fuel economy improving effect by the neutral control lessens. On the other hand, when the amount of particulate matter accumulated in the catalyst unit 30 is equal to or smaller than the reference value PMt2, that is when the necessity of executing the catalyst heating control is low, the neutral control is executed on the condition that the temperature of the catalyst unit 30 is not equal to or higher than the activation temperature 30. This feature helps improve the fuel economy. In this way, by prohibiting the execution of the neutral control in accordance with the degree of deterioration of the function of the catalyst unit 30 during the catalyst heating control, the improvement of the fuel economy and the recovery of the function of the catalyst unit 30 can be both achieved effectively.

(Effect 2) Because the catalyst heating control is executed on the condition that the accumulated particulate matter amount PMA has exceeded the reference value PMt1, the execution of the catalyst heating control reduces the negative pressure of the exhaust gas in the exhaust passage 14, which improves the fuel economy as well as recovering the function of the catalyst.

(Effect 3) Even in the case where it is determined that the accumulated particulate matter amount PMA, that is the amount of particulate matter accumulated in the catalyst unit 30 is equal to or smaller than the reference value PMt2, the execution of the neutral control is prohibited if the temperature of the catalyst unit 30 is equal to or higher than its activation temperature TC. Therefore, even in the case where the accumulated particulate matter amount PMA is relatively small, if the temperature of the catalyst unit 30 is high, the execution of the neutral control is prohibited and this improves the efficiency of the catalyst heating control and thus helps recover the function of the 40 promptly.

(Effect 4) Because the reference value for the temperature of the catalyst unit 30 is set substantially equal to the activation temperature TC of the catalyst unit 30, the function of the catalyst unit 30 can be reliably recovered through the catalyst heating control.

The vehicle control apparatus of the foregoing example embodiment may be modified in various forms such as those described below.

(a) While the vehicle control apparatus of the foregoing example embodiment is adapted to execute the catalyst heating control for the purpose of combusting and thus removing the particulate matter accumulated in the catalyst unit 30, it may alternatively be adapted to execute the catalyst heating control for the purpose of combusting and thus removing sulfur in the catalyst unit 30 (that is, the oxygen catalyst 32), or for other similar purposes. In this case, for example, in order to recover the function of the catalyst unit 30 that has deteriorated due to sulfur poisoning, the vehicle control apparatus executes the catalyst heating control when it is determined that the amount of sulfur accumulated in the catalyst unit 30 has exceeded a reference value.

(b) While the vehicle control apparatus of the foregoing example embodiment is adapted to use the activation temperature TC of the catalyst unit 30, which is a fixed value, as the reference value for the temperature of the catalyst unit 30 in step 105, the reference value for the temperature of the catalyst unit 30 may alternatively be a value that changes in accordance with, for example, the accumulated particulate matter amount PMA calculated in step 101.

In this case, for example, the reference value may be set using a function map, or the like, which is formulated such that the reference value decreases as the accumulated particulate matter amount PMA increases. Setting the reference value in this manner provides the following advantages. That is, when the amount of particulate matter accumulated in the catalyst unit 30 is large, the neutral control is more likely to be prohibited, and therefore the particulate matter accumulated in the catalyst unit 30 can be combusted and removed more efficiently. On the other hand, when the amount of particulate matter accumulated in the catalyst unit 30 is small, the neutral control is more likely to be executed, and therefore the fuel economy can be further improved.

(c) As described above, the vehicle control apparatus of the foregoing example embodiment is adapted to determine whether the temperature of the catalyst unit 30 is equal to or higher than the predetermined temperature after determining that the amount of particulate matter accumulated in the catalyst unit 30 is equal to or smaller than the reference value PMt2. Alternatively, the vehicle control apparatus may be adapted to execute the neutral control only on the condition that the amount of particulate matter accumulated in the catalyst unit 30 is equal to or smaller than the reference value PMt2.

(d) As described above, the vehicle control apparatus of the foregoing example embodiment is adapted to use, as the temperature of the catalyst unit 30, the catalyst temperature TPC estimated from the upstream side exhaust gas temperature TOB and the downstream side exhaust gas temperature TOA. Alternatively, the vehicle control apparatus may be adapted to use, as the temperature of the catalyst unit 30, a temperature directly detected from the catalyst unit 30 or a temperature estimated from the engine speed NE, the intake air amount in the intake passage 13, the fuel injection amount Q, etc.

(e) As described above, the vehicle control apparatus of the foregoing example embodiment is adapted to calculate the accumulated particulate matter amount PMA based on the engine speed NE, the fuel injection Q, etc. Alternatively, the vehicle control apparatus may be adapted to calculate the accumulated particulate matter amount PMA based on the differential pressure between the exhaust gas on the upstream side of the catalyst unit 30 and the exhaust gas on the downstream side of the catalyst unit 30.

What is claimed is:

1. A vehicle control apparatus comprising:
a controller, wherein:
when predetermined conditions are satisfied, the controller executes a neutral control that forcibly places an automatic transmission in a substantially neutral state, the predetermined conditions including a shift position of the automatic transmission being in a drive position;
when it is determined that the amount of exhaust matter accumulated in a catalyst provided in an exhaust system of a vehicle has exceeded a first reference value, the controller executes a catalyst heating control that increases the temperature of the catalyst so as to remove the exhaust matter accumulated in the catalyst; and
when it is determined during the catalyst heating control that the amount of the exhaust matter accumulated in the catalyst has exceeded a second reference value that is larger than the first reference value, the controller prohibits the execution of the neutral control.

2. The vehicle control apparatus according to claim 1, wherein
the predetermined conditions further include at least one of: a coolant temperature of an engine of the vehicle being higher than a reference value; the deviation between the maximum value and the minimum value of the engine speed of the engine during a given time period being equal to or smaller than a reference value for determining fluctuation of the engine speed; and the speed of the vehicle being zero.

3. The vehicle control apparatus according to claim 1, wherein
the catalyst has a function of trapping particulate matter contained in exhaust gas as the exhaust matter.

4. The vehicle control apparatus according to claim 3, wherein
the controller calculates the amount of the particulate matter accumulated in the catalyst by referring to a function map defining a relation among the engine speed, a fuel injection amount, and the amount of the particulate matter accumulated in the catalyst.

5. The vehicle control apparatus according to claim 1, wherein
the catalyst heating control removes sulfur as the exhaust matter.

6. The vehicle control apparatus according to claim 1, wherein
even when it is determined during the catalyst heating control that the amount of the exhaust matter accumulated in the catalyst is equal to or smaller than the second reference value, the controller prohibits the execution of the neutral control if the temperature of the catalyst is equal to or higher than a predetermined temperature.

7. The vehicle control apparatus according to claim 6, wherein
the predetermined temperature is substantially equal to an activation temperature of the catalyst.

8. The vehicle control apparatus according to claim 6, wherein
the predetermined temperature is variably set in accordance with the amount of the exhaust matter accumulated in the catalyst.

9. The vehicle control apparatus according to claim 8, wherein
the predetermined temperature is set using a function map that is formulated such that the predetermined temperature decreases as the amount of the exhaust matter accumulated in the catalyst increases.

10. The vehicle control apparatus according to claim 1, wherein
the temperature of the catalyst is a temperature estimated from the temperature of exhaust gas on the upstream side of the catalyst and the temperature of exhaust gas on the downstream side of the catalyst or a temperature directly detected from the catalyst.

11. The vehicle control apparatus according to claim 1, wherein
the temperature of the catalyst is a temperature estimated from at least one of the engine speed of an engine of the vehicle, the intake air amount in an intake passage of the engine, and a fuel injection amount to the engine.

12. The vehicle control apparatus according to claim 1, wherein
the temperature of the catalyst is calculated based on the differential pressure between the exhaust gas on the upstream side of the catalyst and the exhaust gas on the downstream side of the catalyst.

13. A vehicle control method comprising:
forcibly placing an automatic transmission in a substantially neutral state when predetermined conditions are satisfied, the predetermined conditions including a shift position of the automatic transmission being in a drive position; and
increasing the temperature of a catalyst provided in an exhaust system of a vehicle so as to remove exhaust matter accumulated in the catalyst when it is determined that the amount of the exhaust matter accumulated in the catalyst has exceeded a first reference value, wherein
when it is determined during the catalyst heating control that the amount of the exhaust matter accumulated in the catalyst has exceeded a second reference value that is larger than the first reference value, the execution of the forcible placement of the automatic transmission into a substantially neutral state is prohibited.

14. The vehicle control method according to claim 13, wherein
even when it is determined during the increasing of the temperature of the catalyst that the amount of the exhaust matter accumulated in the catalyst is equal to or smaller than the second reference value, if the temperature of the catalyst is equal to or higher than a predetermined temperature, the execution of the forcible placement of the automatic transmission into a substantially neutral state is prohibited.

* * * * *